US012483553B2

(12) United States Patent
Mars et al.

(10) Patent No.: US 12,483,553 B2
(45) Date of Patent: *Nov. 25, 2025

(54) METHODS AND APPARATUS FOR FACILITATING NFC TRANSACTIONS

(71) Applicant: Ouraring Inc., San Francisco, CA (US)

(72) Inventors: Denis Mars, San Francisco, CA (US); Simon Ratner, San Francisco, CA (US)

(73) Assignee: Oura Health Oy, Oulu (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/419,320

(22) Filed: Jan. 22, 2024

(65) Prior Publication Data

US 2024/0187407 A1 Jun. 6, 2024

Related U.S. Application Data

(63) Continuation of application No. 17/229,762, filed on Apr. 13, 2021, now Pat. No. 11,916,900.

(Continued)

(51) Int. Cl.
*H04L 9/40* (2022.01)
*G06F 3/01* (2006.01)
*H04W 4/80* (2018.01)

(52) U.S. Cl.
CPC .......... *H04L 63/0861* (2013.01); *G06F 3/017* (2013.01); *H04L 63/0807* (2013.01);
(Continued)

(58) Field of Classification Search
CPC .............. H04L 63/0861; H04L 63/102; H04L 63/0807; G06F 3/017; H04W 4/80;
(Continued)

(56) References Cited

U.S. PATENT DOCUMENTS 5,897,989 A * 4/1999 Beecham ............... A61B 5/117
435/5
9,002,739 B2 * 4/2015 Shin ..................... G06Q 20/306
705/35

(Continued)

FOREIGN PATENT DOCUMENTS

WO 2014/126987 A1 8/2014
WO 2019/204596 A1 10/2019

OTHER PUBLICATIONS

International Search Report and Written Opinion for PCT/US2021/027156 mailed Jul. 21, 2021.

*Primary Examiner* — Eric W Shepperd
(74) *Attorney, Agent, or Firm* — Holland & Hart LLP

(57) ABSTRACT

A method for controlling a remote control device includes capturing with a biometric device biometric data associated with a user, determining with processor whether the user is authorized to interact with the smart device, in response to the biometric data, determining with the processor user data, in response to the user being authorized to interact with the smart device, receiving with a short-range transceiver an authentication request from a reader device associated with a remote control device, outputting with the short-range transceiver a session token in response to the authentication request and to the user data, thereafter determining with a physical sensor physical perturbations in response to physical actions of the user, determining with the processor a requested action for the remote control device, in response to the user data and the physical perturbations, and outputting with the short-range transceiver the requested action to the reader device.

20 Claims, 8 Drawing Sheets

Related U.S. Application Data

(60) Provisional application No. 63/009,323, filed on Apr. 13, 2020.

(52) U.S. Cl.
CPC .......... *H04L 63/102* (2013.01); *H04L 63/108* (2013.01); *H04W 4/80* (2018.02)

(58) Field of Classification Search
CPC .... H04W 12/33; H04W 12/68; G05D 1/0016; G05D 1/0022
See application file for complete search history.

(56) References Cited

U.S. PATENT DOCUMENTS

| | | | |
|---|---|---|---|
| 11,009,908 | B1 | 5/2021 | Huang et al. |
| 11,916,900 | B2 | 2/2024 | Mars et al. |
| 2004/0123320 | A1 | 6/2004 | Daily et al. |
| 2013/0106686 | A1 | 5/2013 | Bennett |
| 2013/0307765 | A1 | 11/2013 | Li |
| 2013/0312018 | A1 | 11/2013 | Elliott et al. |
| 2014/0006039 | A1* | 1/2014 | Khan ................. G06Q 10/0639 705/2 |
| 2014/0009378 | A1 | 1/2014 | Chew |
| 2014/0188770 | A1* | 7/2014 | Agrafioti ................ G06F 21/316 706/13 |
| 2014/0191972 | A1 | 7/2014 | Case et al. |
| 2014/0316763 | A1 | 10/2014 | Tardif |
| 2015/0105017 | A1 | 4/2015 | Holmquist et al. |
| 2015/0277568 | A1 | 10/2015 | Veeramani et al. |
| 2017/0019401 | A1* | 1/2017 | Feder ................. G06Q 20/3223 |
| 2017/0083197 | A1 | 3/2017 | Lee et al. |
| 2017/0187771 | A1 | 6/2017 | Falcon |
| 2018/0075068 | A1 | 3/2018 | Paulson |
| 2018/0095588 | A1 | 4/2018 | Klein et al. |
| 2019/0098004 | A1 | 3/2019 | Mars et al. |
| 2019/0142350 | A1* | 5/2019 | Bastide .................. G16B 50/00 600/300 |
| 2020/0077246 | A1 | 3/2020 | Mars et al. |
| 2020/0321128 | A1* | 10/2020 | Nakajima ................ A61B 5/00 |
| 2021/0072378 | A1* | 3/2021 | Shin ........................ G01S 15/88 |
| 2021/0320918 | A1 | 10/2021 | Mars et al. |
| 2022/0375318 | A1 | 11/2022 | Trundle et al. |

\* cited by examiner

METHODS AND APPARATUS FOR FACILITATING NFC TRANSACTIONS

CROSS REFERENCE

The present application for Patent is a Continuation of U.S. patent application Ser. No. 17/229,762 by Mars et al., entitled "AUTHORIZED REMOTE CONTROL DEVICE GESTURE CONTROL METHODS AND APPARATUS," filed Apr. 13, 2021, which claims priority to U.S. Provisional Patent Application No. 63/009,323 by Mars et al., entitled "AUTHORIZED REMOTE CONTROL DEVICE GESTURE CONTROL METHODS AND APPARATUS," filed Apr. 13, 2020, each of which are expressly incorporated by reference herein.

BACKGROUND

The present invention relates to user authentication. More specifically, the present invention relates to determining and authorizing of user gestures in order to control access to goods, services, locations, and the like. Still further, the invention relates to maintaining privacy of users.

User control of goods, services, locations, or the like are often based upon "identification" of the user. The identification may be direct, i.e. through the capture of biometric data of the user, passwords, or the like, or indirect, i.e. based upon presentation of a smart card, credit card, or the like. Additionally, the identifications are typically performed on demand, in real-time.

As an example of direct authentication, a user may provide a thumb print to a terminal, in response the terminal may send the thumb print to a fingerprint database, the database may authenticate the finger print and send an authentication signal back to the terminal, finally, the terminal may open a gate for the user to pass in response to the authentication signal. A problem with such approaches includes that privacy is often forfeited by the user. More specifically, when biometric data of the user is captured, it is transmitted over computer networks and is compared to biometric data stored in databases. Because such personal data is highly sensitive, the computer networks and biometric databases are often targets for attack by hackers, governments, or the like. Another problem is that the user's access to goods, services, or the like may be recorded in such databases. Because of this, behavioral profiles be built up and used to target the user, without the user's consent.

As an example of indirect authentication, a user may present an employee badge to a terminal, in response the terminal may read the badge and send the card number to an employee database. The database may authenticate the card number and send an authentication signal back to the terminal. Finally, the terminal may retract a door latch to allow the user to pass into a building response to the authentication signal. A problem with such approaches includes that they do not guarantee that the user is the one using the employee badge. A person finding the employee badge on the ground may also present the employee badge to the terminal and be granted access. Yet another problem is that dedicated hardware such as badges are relatively expensive and are often misplaced or lost.

An additional problem with the above methods is that the terminals often require real-time access to a back-end database to determine whether the user is authorized or not. Further, in some cases the user may also be required have real-time access to a network to provide specific data to the terminals. Because of this, the locations of the terminals (and users) may be limited, as terminals must have wireless access or hard-wired access to a computer network, and as users will require wireless access to network resources. Such solutions are disfavored for applications where network wires are not readily accessible; for places where there are limited wireless coverage, e.g. basements, secure facilities, retrofit applications, or the like; for other places where computer network coverage is not dependable, and the like. Without reliable coverage, the service to the user will also be undependable (e.g. a user will not be allowed into a building, a user will not be provided with appropriate software, a user will not be logged into the appropriate accounts, and the like).

Many current smart devices, such as smart phones, smart watches, fitness trackers include the ability for users to control them via physical actions or gestures. Such gestures may include taps, swipes, shakes, and the like. Some problems with user gestures include that the associated functions are often novelty functions that are not very useful. For example, a gesture for one smart phone includes a user looking downwards on the screen to scroll up on a web page and looking upwards on the screen to scroll down on the web page. Another problem includes that gestures are often not intuitive and are hard to remember. For example, in some operating systems, a single finger swipe, a dual finger swipe, a three-finger swipe, and a four-finger swipe are all associated with different functions. Additionally, gestures are typically closely tied with the device.

Yet another problem with current gesturing is that different people have different ways of performing gestures due to physical limitations, yet the devices force users to perform gestures only in the strict ways it expects. For example, some drones, the user has to hold up their hands in a specific way that is visible to a camera and a drone will perform actions if it can see and recognize the user commands. In such cases, if the lighting is poor or there are many people within the field of view, the drone will not be able to recognize the user command. As another example, it is not uncommon to see an older user swipe their device multiple times to attempt to perform a single swipe function, e.g. pulling up menu, possibly du to arthritis in an older person's fingers, or the like. Because of these complications, the user experience with such devices are reduced.

Additional problem with current gesturing schemes includes that different objects or services to control or access will have different functionality and capabilities. The inventors envision that a standard number of gestures may be defined and associated with standard actions by a gesturing standards entity, however the functions would be very limiting because different devices will have very different possible actions. As examples of very different functionality, the inventors envision an automobile may support a summon feature and a warm up feature; a smart television may support a call to a Netflix application and support providing user credentials to the Netflix application; a vending machine may allow a user to select a drink, specify a temperature for beverages and vend the beverage; and the like. Accordingly, it is not believed that a gestures standards body is feasible.

Remote control of self-powered devices has become more important with the advent of affordable aerial drones (e.g. quadcopters). Currently there are three major ways to control a remote control device: a dedicated controller (e.g., megahertz (MHz) to gigahertz (GHz) range), a smart device (e.g., Wi-Fi signals), or camera-captured gestures (e.g., visual gestures).

Dedicated controllers are useful for precise control of remote control devices, however there are a number of drawbacks. A disadvantage includes that they typically require the operator to pay full attention the remote control device, for example to keep the device within a line of sight. Other disadvantages include that they often have a steep learning curve and are often considered overkill for the average operator. Even smart device control of remote control devices may be cumbersome for the average operator. For example, the operator has to take their phone out of their pocket, instruct the drone to perform a certain action, put their phone away, perform the action they wish to capture, take their phone out, and then instruct the drone to return. As can be seen, conventional control methods are often cumbersome.

Many remote control solutions also rely upon global positioning system (GPS) position of the remote device and the GPS position of the operator to help the remote device return. Such solutions may be beneficial for night or less than ideal weather conditions, however they still have drawbacks. Some drawbacks include that GPS signals typically cannot be received inside a home, a domed stadium, or other enclosed areas, and the like.

Another solution used to control some remote control devices includes the device capturing images of the operator holding different poses. Merely as an example, a "take a picture" command may be the operator making a rectangle with their two hands to a camera. Problems with visual recognition of gestures by video cameras include that it is very lighting dependent. As examples, if a remote control device camera is facing into the sun, the glare may obstruct the camera from seeing the operator; additionally, if the drone is operated at dusk or at night, the camera may not see the operator; and the like. Other problems include that the remote control device may visually lose the operator if the line of sight interrupted by buildings, trees, or the like. Still another problem is that if the operator is far away or in a crowded environment, it is virtually impossible to distinguish movements of the operator versus other people, accordingly, the operator's visual gestures will not be detected.

In light of the above, what is desired are methods for providing customized gesturing functionality to users for control of remote control devices without the drawbacks discussed above.

SUMMARY

The present invention relates to user authentication. More specifically, the present invention relates to authentication of users when requesting actions of peripheral devices in order to access to goods, services, locations, and the like, while maintaining privacy of users.

Some embodiments of the present invention include the user interacting with a peripheral device they wish to control. In some embodiments, the peripheral device may be any electrically or electro/mechanical controlled device, such as a vehicle (e.g. car, drone, smart luggage, shopping cart, golf cart, etc.), an electronic device (e.g. computer, television, etc.), an access point (e.g. security door, security check, an automated door, etc.), a vending location (e.g. ticket machine, point-of-sale (POS) terminal, etc.), a service (e.g. Netflix, Dropbox, Alexa, an internet service, et.), and the like. In some embodiments, the peripheral device includes or is coupled to a reader device, the functionality which is described herein.

In various embodiments, reader device outputs one or more advertisement signals via wireless communications means (e.g. Bluetooth, ultrawide band (UWB), Zigbee, WIFI, etc.) to the user device. The user device may be a smart device, such as a smart phone, smart watch, a fitness tracker, a smart ring, an audio earbud, smart glasses (e.g. audio and/or visual augmented reality (AR)) or the like. Upon receipt by the user smart device, the user device may return an identifier not permanently associated with the user, e.g. an identifier that is valid for a limited amount of time. Additionally, in response to the advertisement signals, the user of the user device may require the user to unlock functionality described below on the user device. In some cases, the user device may receive a password, biometric data (e.g. heartbeat data, blood vessel patterns, fingerprints, facial data, temperature data, Otoacoustic Emissions (OAEs) data, etc.), movement data, or other data that is uniquely associated with the user or which the user only knows In some embodiments, sometimes upon authentication of the user to the user device, the user device sends data to a remote authentication server. The data may include a user identifier associated with the user, data associated with the reader, and the like. In response, the authentication server may determine if the user is authorized to interact with the reader. For example, if the user is authorized to unlock a door of a car, or the like. In some embodiments, if the user is authorized, the authentication server may send back data to the user device. The return data may include a token (encrypted data for the reader device), and in some cases, a gesture map associated with the user and the reader device. In some cases, the gesture map associates specific gestures of the user device and specific actions for the reader device. In other cases, a gesture map may be maintained upon the user device, and the gesture map may be unlocked by the user device or in response to data from the authorization server.

In some embodiments, a user may then physically move the smart device, such as waving their hand (with a smart phone) to the right, left, up or down; moving/pointing their hand (with a smart ring) towards the reader/peripheral device; rotating their hand (with a smart watch) along an x, y, or z-axis; or the like. At the same time, one or more accelerometers, gyroscopes, pressure sensors, magnetometers, temperature sensors, imaging sensors or the like in the smart device capture the user's motions, and then a processor of the smart device determines if the perturbation data matches a known gesture pattern, e.g. a gesture to the right, left, up, down, a circle gesture, a wave or zig-zag gesture, a stop gesture, a point gesture, or the like. Various pattern matching algorithms may be used for this. In cases where the gesture matches one in specified in a gesture map for the user (discussed above), the corresponding action for the reader is determined.

In various embodiments, the token from the authentication server and the requested action are then sent to the reader device. Reader device determines whether the token is valid, sometimes by unencrypting the token with a public key of the authentication server, or the like, and looking at a time stamp stored in the token. In some cases, if the token is valid, the reader device may pass the requested action to the peripheral device, and in other cases, if the token is valid, the reader device may interpret the requested action and provide appropriate commands itself to the peripheral device for execution. In some examples, the actions for the peripheral devices may include: locking into a software service or a computer; preconditioning a vehicle; directing a drone to enter a follow-me state; locking or unlocking a door, automatically opening or closing a door, turning a light on or off, starting or stopping an alarm, and the like for a car; and the like.

In some embodiments of the present invention, the user device may be off-line, thus may be unable to access the authentication server at run-time, described above, Some embodiments include two processes that may occur prior to when authentication is desired. First, a process includes authenticating a user with an authentication server and receiving pre-authentication data therefrom. The pre-authentication data may include a list of reader devices the user is pre-authenticated to communicate or transact with, a pre-authentication token that authenticates the user, and the like. To determine such data, the authentication server may determine an authorized account associated with the user (via email address, telephone number, biometric data, a key, etc.) and based upon policies or other conditions stored within the authentication server, the authentication server may determine a list of reader devices, or the like that the user is authorized to interact with. In some cases, the pre-authentication data may then be cached in secure form or secure location within a user device. User devices may include smart phones, smart watches, smart rings, smart earbuds, smart glasses or the like.

A second process typically comprises a run-time process (after being pre-authenticated), when the user approaches a reader device to control a peripheral device. In some processes, the reader device provides reader data, including an identifier and a nonce (or other random or pseudo random data) to the user device. In response, the user may enter a password, biometric data, or the like, within an application to enable the user device to respond, as described above. Without requiring computer network access, the user device then determines in real-time, whether portions of the reader data have been stored and referenced in the pre-authentication device. If so, the user device generates a responsive data for the reader device. In some cases, the responsive data may include a pre-authentication token, a portion of the reader data (e.g. nonce), and the like. In some cases, the responsive data may be encrypted and then provided to the reader device, along with a requested action. If valid (e/g/cryptographic signature authenticated, within a validity period for the token, nonce validated, or the like), the reader device authorizes the requested action for the peripheral device. As can be seen, at run-time, access to computer networks, or the like is not required for the user device or the reader device, accordingly embodiments may be implemented in highly secure areas, as well as areas with limited computer network coverage.

According to some aspects, a method for a system is disclosed. One method may include capturing with a biometric capture device of a smart device, biometric data associated with a user of the smart device determining with a processor of the smart device, a user profile in in response to the biometric data, and determining with a physical sensor of the smart device, a plurality of physical perturbations in response to physical actions of the user. A process may include determining with the processor of the smart device, a requested user-perceptible action in response to the user profile and the plurality of physical perturbations, receiving with a short-range transceiver of the smart device, an authentication request from a reader device, and outputting with the short-range transceiver of the smart device, a token and identification of the user-perceptible action to the reader device in response to the authentication request, in some cases, the reader device performs or directs performance of the user-perceptible action in response to the identification of the user-perceptible action and to the token being valid.

According to another aspect, a smart device is described. A device may include a capture portion configured to capture, biometric data associated with a user of the smart device, a processor coupled to the capture portion wherein the processor is configured to receive the biometric data, and to determine a user profile associated with the biometric data, and a sensor coupled to the processor, wherein the sensor is configured to determine a plurality of physical perturbations in response to physical actions of the user. An apparatus may include a processor is configured to determine a requested action in response to the user profile an the plurality of physical perturbations, and a short-range transceiver coupled to the processor, wherein the short-range transceiver is configured to receive an authentication request from a reader device, and wherein the short-range transceiver is configured to output a token and identification of the requested action to the reader device in response to the authentication request. In some cases, a reader device directs a peripheral device to perform the requested action in response to the identification of the requested action and to the token being valid.

According to one aspect, a method for controlling a remote control device is disclosed. A process may include capturing with a biometric capture device of a smart device associated with a user, biometric data associated with the user, determining with processor of the smart device, whether the user is authorized to interact with the smart device, in response to the biometric data associated with the user, and determining with the processor a user data, in response to the user being authorized to interact with the smart device. A method may include receiving with a short-range transceiver of the smart device, an authentication request from a reader device associated with a remote control device and outputting with the short-range transceiver of the smart device, a session token in response to the authentication request and to the user data. A process may include determining with a physical sensor of the smart device, a plurality of physical perturbations in response to physical actions of the user, determining with the processor of the smart device, a requested action for the remote control device, in response to the user data and the plurality of physical perturbations, and outputting with the short-range transceiver of the smart device the requested action to the reader device.

According to another aspect, smart device for controlling a remote control device is disclosed. An apparatus may include a biometric capture device configured to capture biometric data associated with the user, and a processor coupled to the biometric capture device, wherein the processor is configured to determine whether the user is authorized to interact with the smart device, in response to the biometric data associated with the user, wherein the processor is configured to determine user data, in response to determining that the user is authorized to interact with the smart device. A device may include a short-range transceiver coupled to the processor, wherein the short-range transceiver is configured to receive an authentication request from a reader device associated with a remote control device, wherein the short-range transceiver is configured to output a session token to the reader device in response to the authentication request and to the user data, and a physical senor coupled to the processor, wherein the physical sensor is configured to determine a plurality of physical perturbations in response to physical actions of the user. A system may include a processor configured to determine a requested action for the remote control device, in response to the user data and the plurality of physical perturbations, and a short-range transceiver configured to output the requested action to the reader device.

BRIEF DESCRIPTION OF THE DRAWINGS

In order to more fully understand the present invention, reference is made to the accompanying drawings. Understanding that these drawings are note to be considered limitations in the scope of the invention, the presently described embodiments and the presently understood best mode of the invention are described with additional detail through use of the accompanying drawings in which.

DETAILED DESCRIPTION

Figure 1:
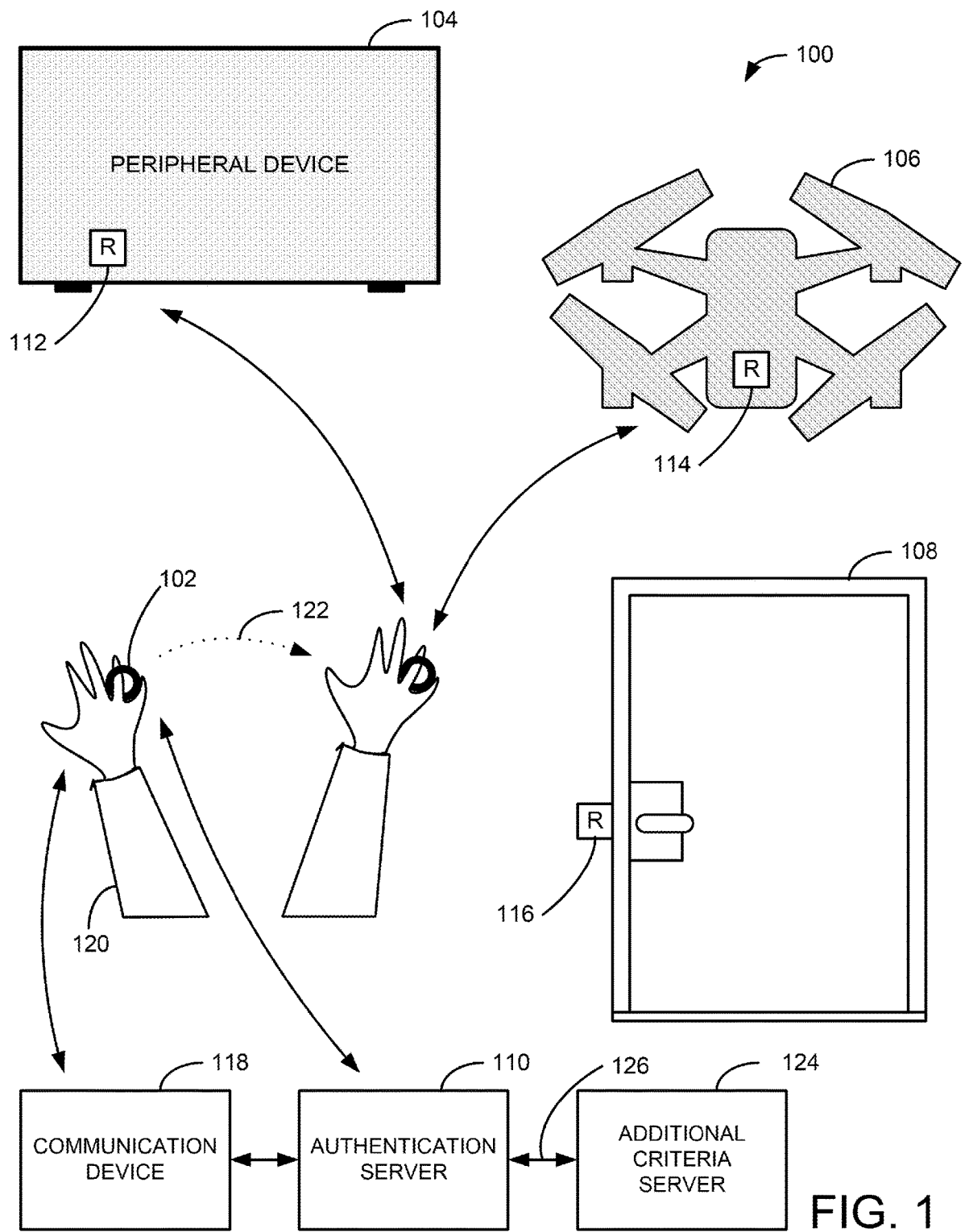
FIG. 1 illustrates a system diagram according to various embodiments.
Figure 2A:
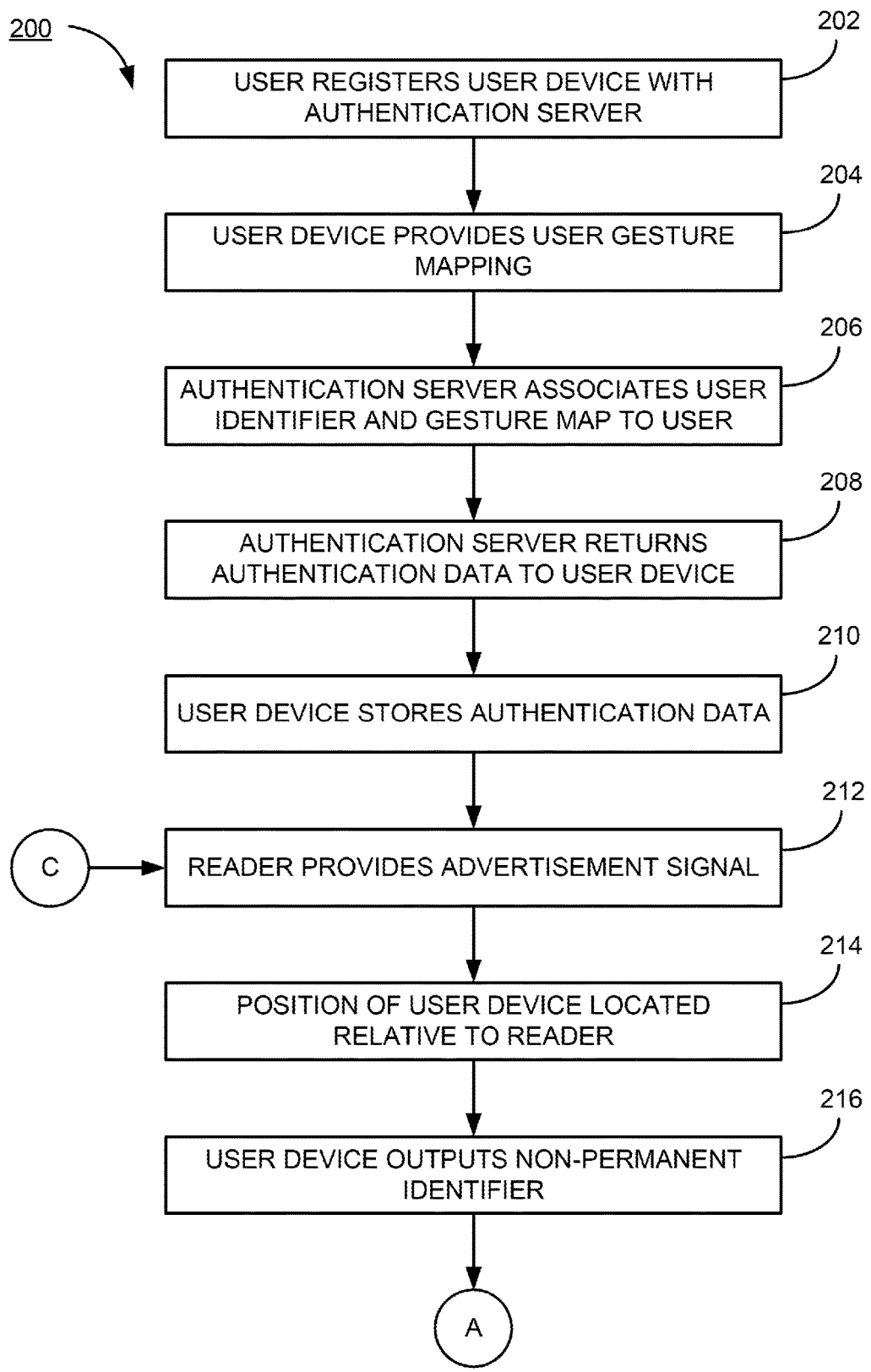
FIGS. 2A-D illustrates a block diagram of a process according to various embodiments.
Figure 2B:
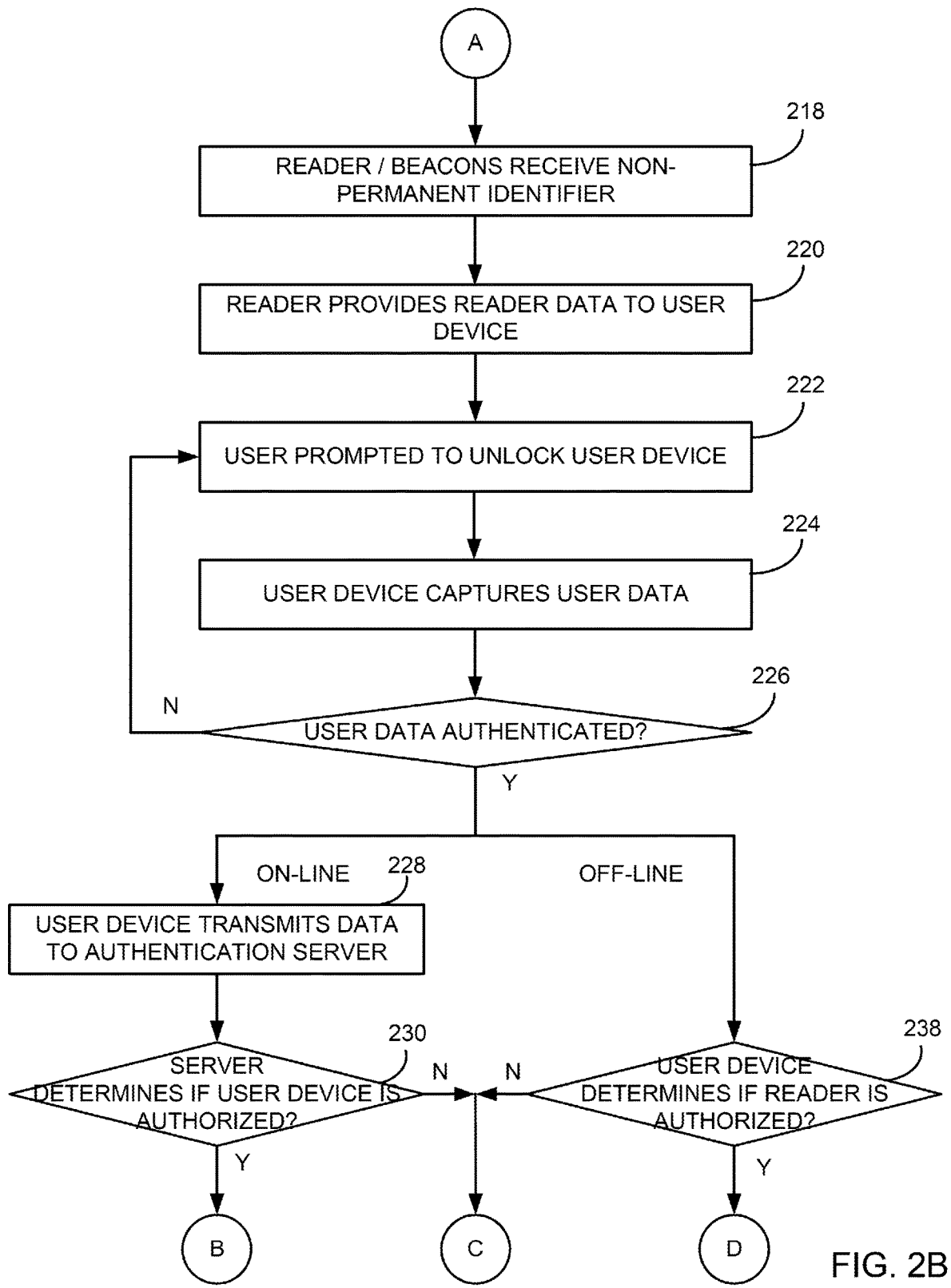
Figure 2C:
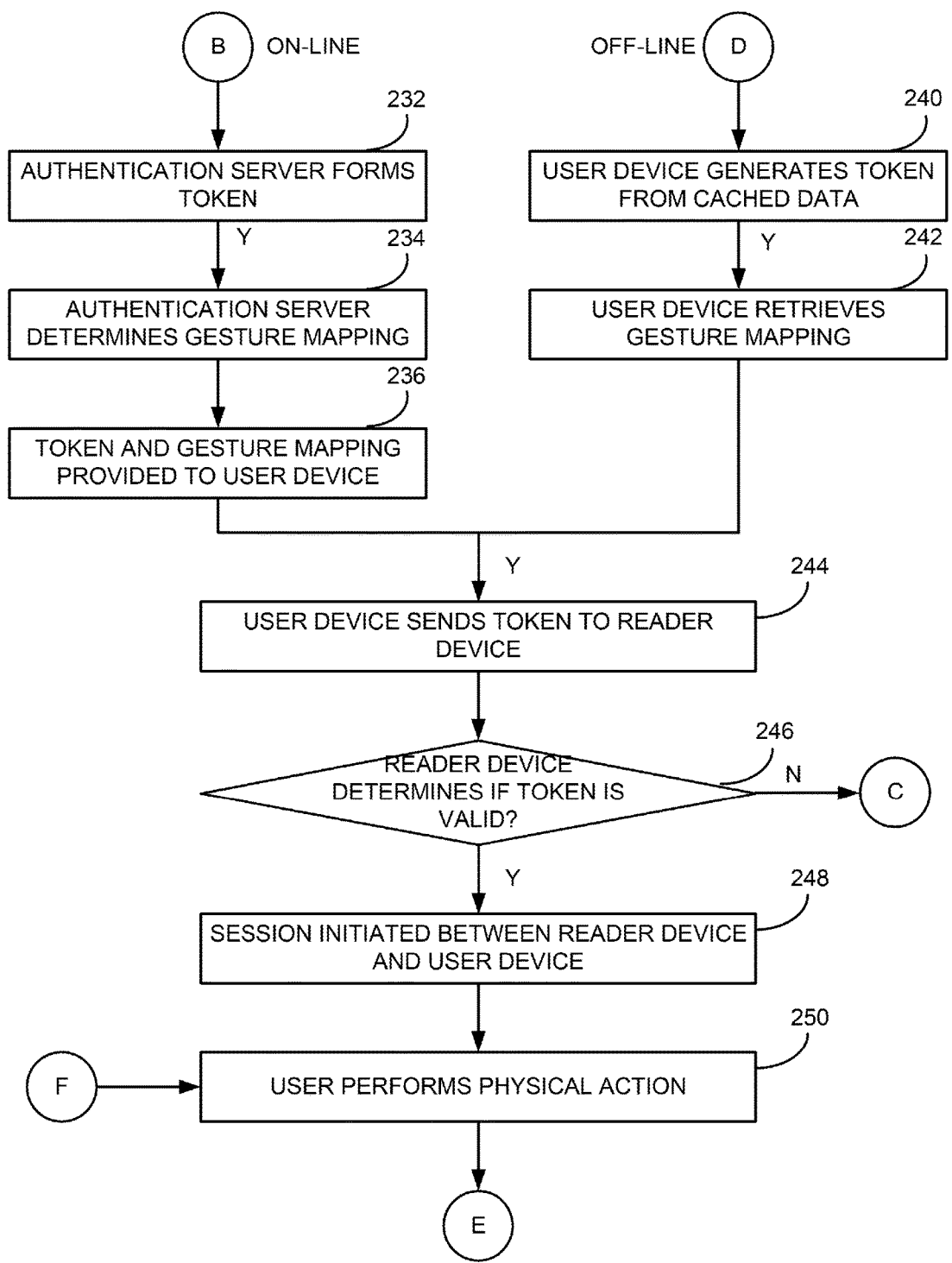
Figure 2D:
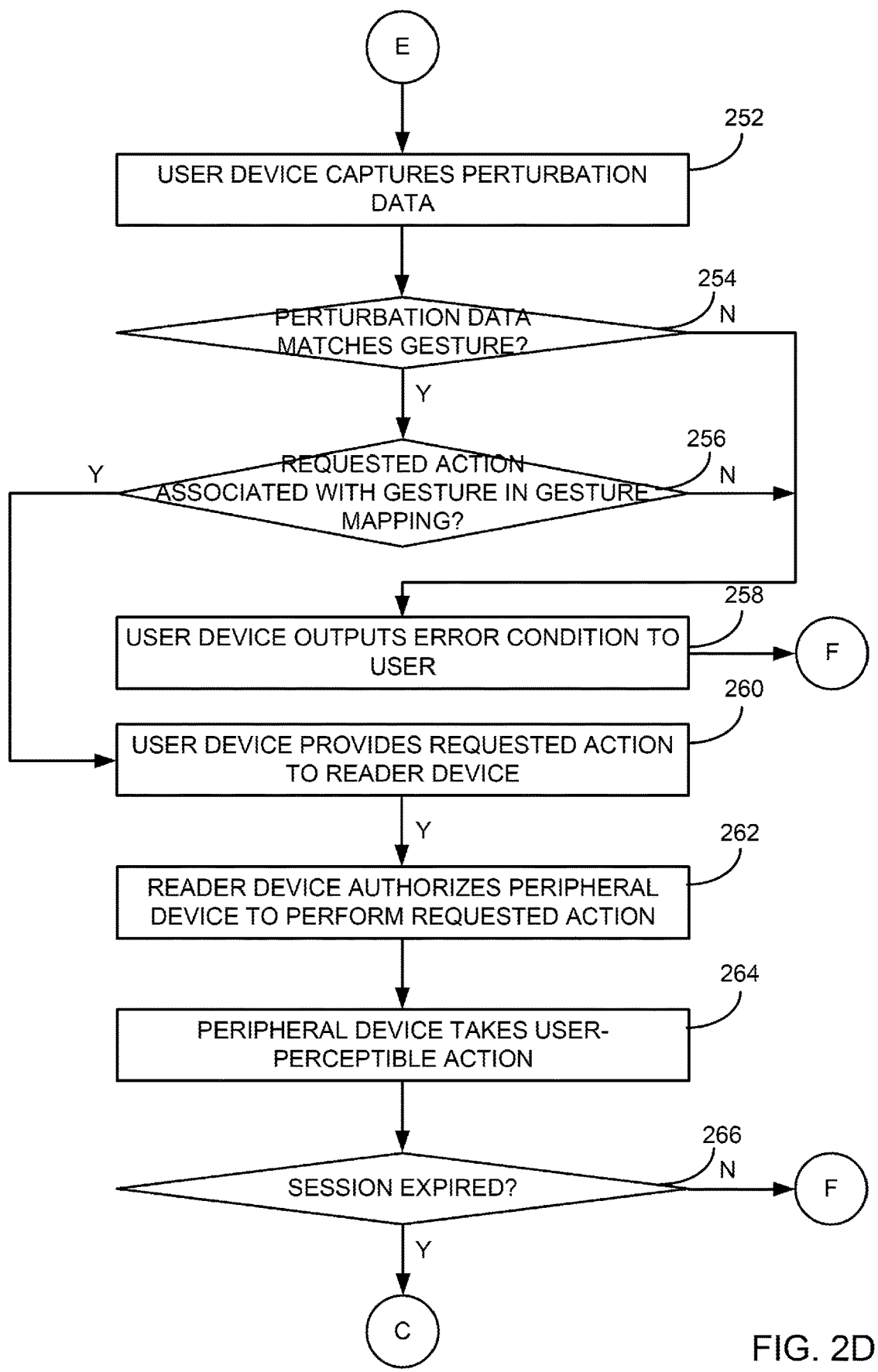

FIG. 1. illustrates a system diagram according to various embodiments. More specifically, FIG. 1 illustrates examples 100 of embodiments of the present invention.

FIG. 1. includes a user device 102, a variety of peripheral devices, such as a television/monitor 104, a drone 106, and a door (e.g. an automated door, a security door) 108, and an authentication server 110. Each peripheral device is respectively coupled to a reader device 112, 114, or 116. In various embodiments, reader devices may be embedded into the peripheral device (e.g. built-in and integrated by the manufacturer) or reader devices may be coupled to the peripheral devices via an interface port or the like.

In various embodiments, smart device 102 communicates directly to authentication server 110 via WIFI, fourth generation (4G), fifth generation (5G), mesh network, or the like. Smart device 102 may also communicate indirectly with authentication server 110 via short-range communications (e.g. Bluetooth, ultrawide band (UWB), ZigBee, etc.) to another smart device 118 that communicates with authentication server 110. In some embodiments, authentication server 110 may be a cloud-based server, thus be an indeterminate number of physical and virtual machines.

In some embodiments, authentication server 110 may be associated with a centralized digital identity management organization or company. In some cases, authentication server 110 may be associated with a governmental, certification, health organization, or the like server 124. As will be described below, such organizations' servers 124 may provide output that can be used to authorize output of an authorization token (e.g. a digitally signed message), when the user meets certain criteria. In some examples, if a user has not tested positive for a disease or has recovered from a disease 126, a token may be authorized (sometimes dependent upon satisfaction of additional criteria) allowing a user to board a ship or plane, for example; if a user has a security clearance 126, a token may be authorized (also dependent upon satisfaction of additional criteria) allowing a user to enter a secure area or allowing a user to log into a secure site; or the like. Advantages to combing such additional criteria systems 124 to authentication server 110, as described herein, include that such embodiments can more accurately determine whether users are allowed to access particular locations, receive particular services, control particular devices, privacy of a user is maintained on server 124 and the like.

In the example in FIG. 1, as a user 120 performs a physical action 122, as will be described further below, user device 102 determines a gesture associated with physical action and determines a desired user action to be performed. Subsequently, user device 102 communicates with the desired reader (112, 114, or 116), and the reader instructs the peripheral device (104, 106 or 108) to perform the desired user action.

FIGS. 2A-D illustrates a block diagram of a process according to various embodiments. More specifically, FIGS. 2A-D illustrates a process 200 that may be performed in some embodiments of the present invention. Without limiting embodiments, for sake of convenience, reference to elements of FIG. 1 will be used below.

Initially, a user 120 of device 102 may register with authentication server 110, step 202. In some embodiments, this may take the form of user 120 registering one or more of their e-mail address, smart phone telephone number, financial information or their like with authentication server 110. In various embodiments, device 102 may be any number of devices such as a laptop, smart phone, tablet, wearable technology, smart watch, ring, audio earbud, smart glasses and the like, In some embodiments, a hardware identifier associated with device 102 may also be provided to authentication server 110.

Figure 3:
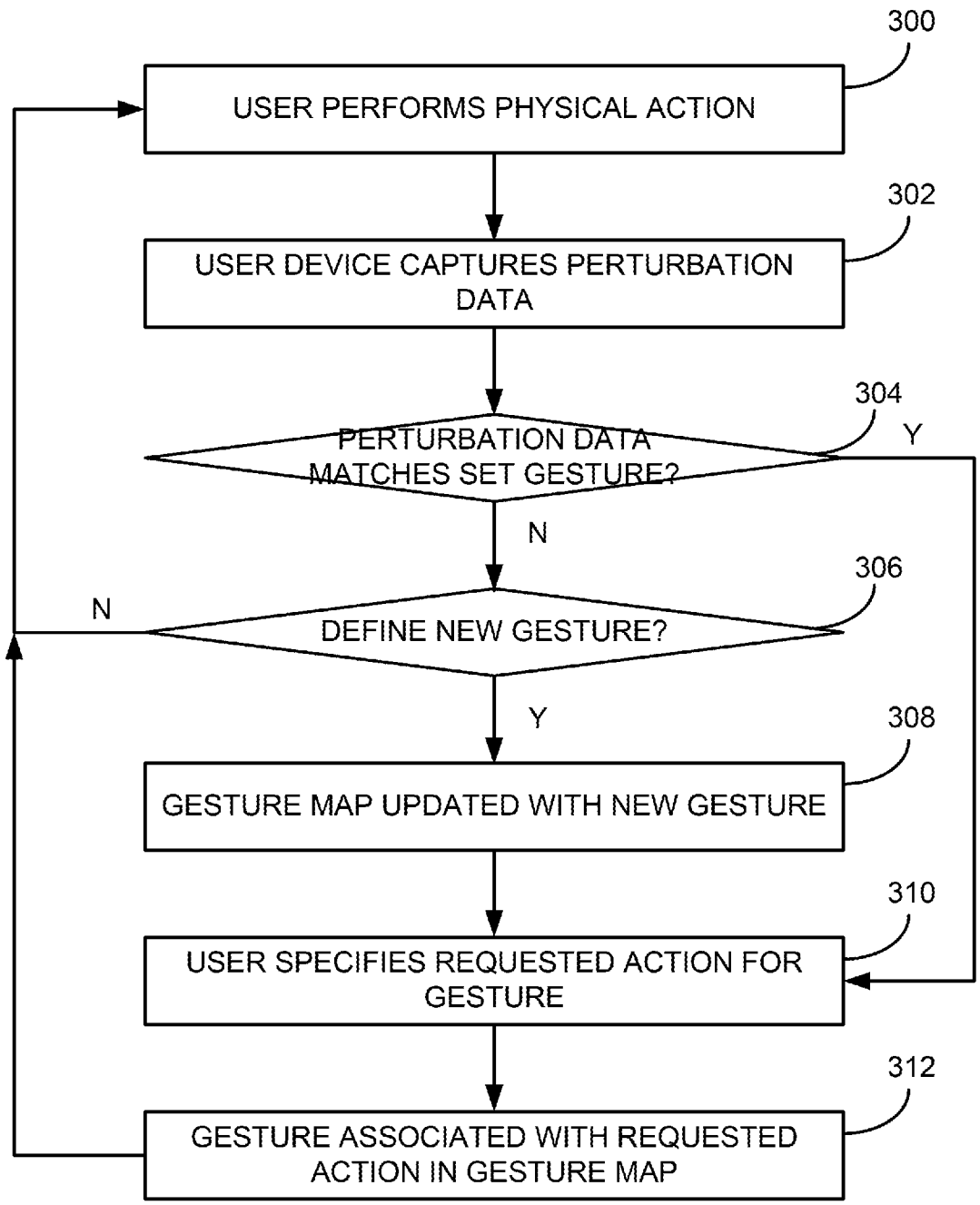
FIG. 3 illustrates another block diagram of a process according to various embodiments.

In some embodiments, smart device 102 may also provide a custom user gesture map to authentication server 110, step 204. In various embodiments, the gesture map may be a mapping between identified gestures and desired user actions. FIG. 3 illustrates a process for determining the gesture map in smart device 102, and further details will be provided below.

In some embodiments, authentication server 110 may determine a user identifier and additional data and associate them with smart device 102 in memory of authentication server 110, step 206. Additionally, the gesture map may also be stored in the memory and associated with the smart device 102.

In some embodiments, the additional data may be utilized as part of a pre-authorization process where the additional data includes off-line authorization data (e.g. a pre-authorization token), as will be described below. In some embodiments, the additional data may also include a list of devices (e.g. reader devices, electronic data, services, etc.) user 120 is authorized to interact with, based upon one or more policies. For example, if the user is a new accounting employee, a corporate policy may specify that the user will be granted access to electronic financial records but not research and development records; the user will be granted access to physical financial data rooms, but not to assembly line regions; the user will be able to control a first drone, but not a second drone; the user will be able to run Excel, but not a computer-aided design (CAD) program; and the like. In various embodiments, the policies may be specified by a system administrator through an administration web site, portal, app, or the like in conjunction with authentication server 110, In some cases, authentication server 110 provides the user identifier and additional data to back to smart device 102, step 208. In some embodiments, different gesture maps appropriate for readers pre-authorized for the user may also be provided to smart device 102, e/g/ a drone gesture map, a vending machine gesture map, and the like.

In various embodiments, access to physical locations, to electronic documents, to services (e.g. wireless power), to physical objects, or control of physical objects, and the like may be controlled via readers devices such as readers 112, 114 or 116. In some embodiments, reader devices may be associated with reader identifiers, and authentication server 110 may determine which reader identifiers or reader devices a user/user identifier is authorized to access. In one example. a user identifier may be associated a list of reader devices that includes reader devices within a first building, but not a second building; with a first set of computers, but not a second set of computers; a first computer network, but not a second network; a first controlled access, but not a second controlled access point; and the like. Accordingly, in such examples, the off-line authorization data, described above, may specify identifiers for reader devices associated with the authorized goods or services, e/g/ with the first building, the first set of computers, the first computer network.

In various embodiments, the user identifier and the additional data may be stored in device 102, step 210. In some cases, the data from authentication server 110 may be stored in a (software) encrypted or protected form in a conventional memory in device 102. In other cases, device 102 may include a separate secure hardware memory device, where the data is stored in an (hardware) encrypted or protected form, or the like.

In operation, periodically, readers, e.g. 112, 114 and 116 output an advertisement signal via short-range communications, step 212. In some processes, device 102 includes a short-range transmission device, such as ultrawide band (UWB), Bluetooth (including BLE), ZigBee, Wi-Fi, or the like that provides the herein described wireless transmissions. In some embodiments, readers and/or devices 102 may normally utilize a low-power/low-bandwidth transmitter, e.g. BLE to provide the advertisement signal/for sensing the advertisement signals. However, after the reader receives return communications from user device 102, discussed below, readers and/or devices 102 may utilize a higher-power/higher-bandwidth transceiver, e.g. UWB to communicate with device 102/to communicate with the reader. This advantageously reduces the power consumption of reader devices and/or user smart devise 102 when in the advertisement state/sensing for advertisement signals state.

Next, user 120 carries or moves device 102 within the operating region of the readers, e.g. 112, 114 and 116, step 2114. In various embodiments, the region may be an interior location, e.g. an office, a library, a convention center or the like, or an outdoor location, e.g. a fairground, amusement park, or the like. In some cases when smart device 102 receives the advertisement signal, smart device 102 may respond with an identification signal, step 216. In cases where there is overlapping advertisement regions, user 102 may select the reader they are specifically interested in. In some embodiments, device 102 may use the same wireless transmission technology.

As discussed above, the identification signal output by smart device 102 may not be permanently associated with device 102 or the user, accordingly, readers do not necessarily know the actual identity of the user. This lack of user identifiable information is believed to be highly advantageous for readers, as user identification and usage of such services is not stored within those devices or such data are stale after a period of time. For example, reader 112 may temporary store a first non-permanent identifier of the user device, however periodically user device 102 will change or rotate the non-permanent identifier and the second non-permanent identifier, accordingly reader 112 may not be able to track the usage by the user. In some cases, usage data of the user may only be maintained by authentication server 110, so that authorization for payment, for example, may be reconciled. In other cases, authentication server 110 may only be used for authorization, and user usage data is not maintained. Additionally, because user identifiable information is not maintained in such devices (e.g. readers 112, 114 and 116), hackers, government-directed actors, or the like will be less inclined to hack into such systems to obtain user data. The operation of these systems will be thus be improved as they will store less sensitive data, will have lower memory requirements, and will be less targeted for hacking, or the like.

In various embodiments, readers receive the identification signal from device 102, step 218, and outputs reader data back to smart device 102, step 220. In various embodiments, the reader data may include a unique identifier (reader or peripheral identifier) and additional data, such as a nonce, a random or pseudo-random number, or the like. These communications may also utilize a similar short-range transmission mechanism used in steps 212 and 214, above.

In some embodiments, user 120 may be prompted to unlock device 102, step 222. In other embodiments, a specific prompt may not be necessary when specific types of biometric data is utilized. For example, smart device 102 may automatically turn-on sensors that can capture heartbeat data, blood vessel maps, or the like. In other examples, smart device 102 may capture performance data such as gait data, a list of frequented or seen reader devices, or the like, throughout the day. Such performance data can then be stored in a memory. In some cases, this performance data and optionally all other data on the ring may automatically be deleted from memory when smart device 102 is removed or taken off. In various embodiments directed to smart devices that are worn by a user, there are many ways to determine when smart device 120 is taken off. In some examples, if smart device 120 senses a loss of heartbeat data combined with a temperature change, if smart device 120 senses a pressure change and loss of blood vessel image data, if there is a temperature change associated with a free-fall event, and the like. This automatic delete function reduces the chance that when the user takes off a ring, a watch, earbud, etc. a second user could then use the smart device and pretend to be the first user.

IN response to a prompt in step 222, user 120 may provide a password, a PIN, biometric data (e.g. fingerprint, facial images, iris scan, blood vessel data, audio outputs, heartbeat data, otoacoustic emission (OAE) profile, etc.), performance data (e.g. performing particular gestures or actions), previously stored performance data (e.g. gait), or the like, step 224. In other embodiments, a second-factor authentication may also be used (e.g. confirmation telephone call, text, e-mail message, etc.). If the user data input (or hash thereof) matches data stored in memory, the process described below may continue. In some embodiments, and automatic delete function may occur when the smart device detects a different set of parameters for a second user compared to a first user using the smart device. For example, for a second user, if a different heartbeat pattern is detected, if a different blood vessel patter is detected, if a different OAE profile is detected, and the like, compared to the previous (e.g. first user) smart device 120 may lock or automatically delete data associated with the first user, and any other user.

In various embodiments, two processes for user device 102 providing a responsive token to reader devices are contemplated, on on-line embodiment and an off-line embodiment and will be described below.

In one set of embodiments, in response to successful user identity unlock, step 224, user device 102 may transmit some or all of the reader data (step 220) and the user identifier (step 206) to authentication server 110, step 228. In some cases, device 102 may use any conventional transmission technology, e.g. 4G, 5G, Wi-Fi, mesh-network (Bluetooth, UWB), or the like to communicate with authentication server 110. In response to this data, authentication server 110 may verify that the user identifier is authorized to communicate/operate with reader 114, step 230. In particular, authentication server 110 may determine whether the user identifier is stored in a database or the like, and if so, whether it has permission to communicate with the reader (e.g. 116). For example, within the authentication server, a company has access policies that permit the user to access multiple reader devices (including reader 116). Accordingly, authentication server 110 will then check to see if the user identifier and reader 116 are authorized by the company's access policies. As mentioned above, any number of criteria may be checked before the user is deemed authorized. For example, in step 23—, criteria for determining whether the user is authorized may include one or more of the following: the user is registered (e.g. via a user identifier) with the authentication server; the user is authorized in one or more policies (e.g. the user has access to a mechanical shop); the user has passed health checks or has negative results from particular tests; the user is up to date on subscriptions or memberships (e.g. airport lounges, wireless access, etc.); the user has passed professional qualification criteria, e/g/ licensed to trade securities, licensed to be a commercial pilot or drone pilot; the user is ticketed (e.g. for a flight, a performance, a show, a convention, etc.); and the like.)

In various embodiments, if the user is authorized, authentication server 110 may form a token by encrypting a data payload that includes portions of the reader data, such as the nonce, the reader data, or the like, step 232. In various embodiments, encryption may be performed by digitally signing the payload data (e.g. nonce, valid time period, expiration time, etc.) with a private key associated with authentication server 110, or the like. In other embodiments, other types of encryption (e.g. symmetric key) may also be used, and additionally, hashing or the like may also be performed.

In various embodiments, in response to the user identifier, authentication server 110 may also retrieve a gesture map associated with the user and/or the reader (e.g. 116), step 234. In some embodiments, the gesture map is the gesture map provided to authentication server 110 in step 204. In some cases, the gesture map may be a custom map specified by company policies. For example, a first gesture map may be provided for employees in a warehouse (e.g. for directing robots) and a second gesture map may be provided for employees on a trading floor (e.g. for by/sell orders), and the like. In other embodiments, gesture maps may be associated with specific reader/peripheral devices and thus have unique functions. For example when a reader is associated with a drone (or other user-controlled device e.g. automobile, golf cart, luggage, etc.), gestures may be associated with actions for directing the drone to perform specific actions, such as come closer, move farther away, enter a follow-me mode, move left or right, go lower or higher, rotate left or right, return to base, go to waypoint, take a picture or video, zoom in or out, engine start or stop, or the like: when a reader is associated with a television, specific gestures may be associated with actions for turning on the television, logging into a service (e.g. Netflix, Box.net, Slack, Zoom), adjusting the volume, changing channels, or the like; when a reader is associated with an automobile, gestures may be associated with actions such as warming up the car, locking/unlocking/opening/closing the doors, entering a come to me mode, sounding an alarm or the like.

In various embodiments, the token and appropriate gesture map may then be returned to user device 102, typically using the same transmission technology, step 236.

A second set of embodiments may include a run-time process that does not utilize real-time communications between user device 102 and authentication server 110, e.g. an off-line mode. In some embodiments, in response to successful unlock, step 226, device 102 may determine whether it is authorized to communicate with the specific reader 114. In some embodiments, as discussed in step 208 above, authentication server 110 may also provide off-line authorization data including a pre-authorization token, a list of reader identifiers the user device is authorized to communicate or interact with, and the like. In some embodiments, the list of readers within the device 102 may be periodically updated upon request of device 102 or pushed by authentication server 110 e.g. once a day, once a week, when device 102 is within communication range capability of authentication server 110, or the like. As examples, device 102 may be updated at midnight; authentication server 110 may push updated data to device 102 once a week or immediately, when an update to policies occurs; when device 102 may be updated when docked or charging; and the like. In some embodiments, if custom user gesture maps are not desired, gesture maps appropriate for the authorized readers may also be updated.

In some embodiments, the communication between device 102 and authentication server 110 (e.g. in step 206) may be facilitated by another local device, e.g. a user's smart phone, a desktop or laptop computer, and the like. Such embodiments reduce the need for device 102 to communicate directly with authentication server 110. Instead, the user device 102 communicates with authentication server 110 to receive the off-line authorization data via short-range means with the local device. In some embodiments, the short-range means may include direct connection, (e.g., a cable, or a dock), a wireless connection (e.g., Bluetooth, Zigbee, UWB, impulse radio (IR), Wi-F or the like).

In various embodiments of the off-line mode, in step 238, the reader identifier associated with reader (e.g. 112, 114, 116, etc.) may be compared to a list of readers with which it is authorized to communicate (in the off-line authorization data). In some embodiments, the reader identifier, user identifier, gesture maps and other secure data the like may be input to a secure storage device/processor, and a yes or no response may be output from the device. In some embodiments, user device 102 provides an indication to user 120 that the reader device is authorized, and in other embodiments, no visible feedback is provided to user 120. If communication with the specific reader is authorized, device 102 may use the previously discussed off-line authorization data stored in secure hardware memory device, such as the pre-authorization token, and the reader identifier, the nonce, or the like to generate a token, step 240. In some embodiments, the nonce, reader identifier, and the like may be stored in a payload section of the token, or the like. In some embodiments, steps 238 and 240 may be performed within the secure memory device itself, by a processor of the device, and combinations thereof. In some embodiments, the off-line authorization data may itself include a digitally signed data payload, or the like.

In some embodiments, if a custom user gesture map has been pre-defined and stored in memory, that gesture map may be retrieved for use, step 242. As will be described below, the custom user gesture map or gesture map associated with a specific reader device are utilized after a session between user device 102 and a reader (e.g. 112, 114, 116, etc.) is established.

Next, in various embodiments, if a token described above is received or formed within user device 102, it may then be transmitted to the specific reader, typically using the same transmission technology (e.g. UWB, Bluetooth, BLE, Zig-Bee, Wi-Fi, etc.), step 244. In some embodiments, additional data may be combined with the token, or passed along with the token (within a payload data portion) to the reader. The additional data may include data gathered by user device 112, e.g. GPS data, user movement indicia, history data (e.g. a list or readers seen by device 112), and the like. In some cases, this additional data may be encrypted using a symmetric key, or the like to protect the data during transmission.

In various embodiments, in response to the token, reader device 114 determines whether the token is valid, step 246. In some cases, reader device 114 uses a public key associated with authentication server 110 to determine if the data payload was digitally signed by authentication server 110. Additionally, reader device 114 may determine whether a time period associated with the token is valid, e/g/ has the token expired?, is the current time within a temporal validify period of the token?, etc. Still further, by keeping track of the nonce, or the like, when transmitting the reader data to user device 102, reader device 114 may reduce the chance that the token can be reused.

In various embodiments, if the token is validated and has not expired, and the nonce data, or the like is authenticated, a session may be created between user device 102 and the specific reader device, step 248. The session may last a pre-determined time period, e.g. 10 minutes, 1 hour, 12 hours, or the like, or may expire if there is no interaction between user device 102 and the reader for a pre-determined time period, e.g. 1 minute, 10 minutes, 1 hour, or the like.

In various embodiments, as user 120 approaches a reader device (optionally integrated into a peripheral device), user smart device 102 may communicate with the reader device using low bandwidth (and low power) communications, such as Bluetooth Low Energy, Zigbee, or the like. Further, when a session is established in step 248, user smart device 102 many switch on its high bandwidth (and high power) communications transceiver, such as UWB to interact with the reader or UWB beacons associated with the reader or the peripheral device. This advantageously reduces the power consumption of reader devices and/or user smart devise 102 until a session is established.

In various embodiments, after a session is established, the user may perform a series of physical actions with smart device 102, step 250. Different types of actions may include the user waving smart device 102 to the left, right, up, down; rotating smart device along an x, y or z axis; tapping or applying pressure to smart device 102; moving smart device 102 in a pattern, such as side-to-side, circular or ovoid, approximately polygonal, or the like; moving smart device 102 within a local magnetic field; or the like. In various embodiments, the physical motions are captured by accelerometers, gyroscopes, pressure sensors, magnetometers, imaging sensors, temperature sensors, or the like, step 252. In various embodiments, if smart device 102 is a wearable device, e.g. smart ring, smart watch, fitness tracker, smart earbuds, smart glasses, AR glasses, the gestures may be less intrusive for the user. For example, if a user is controlling a remote control device (e.g. drone), the user may ride a bike, wind surf, drive a vehicle, ski, or the like, pause for a moment and make the gesture, and then quickly continue with their activity.

In various embodiments, on or more UWB beacons may be integrated into reader devices or peripheral devise and a UWB sensor may be integrated into smart device 102. In such embodiments, the positioning of smart device 102 relative to smart device 102 may be determined, often with great accuracy. If two or more UWB beacons are used relative to the reader device or peripheral, the positioning of smart device 102 in three-dimensions is enhanced. Accordingly, as the user performs actions, the UWB sensor may capture perturbation data of the user. This high accuracy perturbation data may be use in lieu of or in addition to the perturbation data determined by the devices described, above, for the processes, below.

In some embodiments, a processor of smart device 102 may take the captured perturbation data and determine if there is a known gesture that best matches it, step 254. Any number of algorithms may be adapted for such matching functionality, such as feature matching algorithms, machine learning algorithms, and the like. Next, if a known gesture is matched, the custom user gesture map, a predefined gesture map associated with a reader device, or combination thereof is used to determine if there is a requested action mapped thereto, step 256. As an example of different gesture maps, a first gesture map may specify that a left movement with user device 102 relative to the reader device may be associated with a back-navigate command for a web browser; a second gesture map may specify that a left movement with user device 102 relative to the reader device may be associated with a direction to move drone to towards the left side of the user; a third gesture map may specify that a left movement with user device 102 relative to the reader device may be associated with an open door action; and the like. If a gesture is not identified or an action is not associated with a determined gesture, user device 102 may provide this feedback to user 120, step 258.

In various embodiments, if a requested action is identified in user device 102, user device 102 may provide the requested action to the reader, step 260. In some embodiments, this communication may be via short-range channel, such as Bluetooth, UWB, Zigbee, and the like. When precise orientation of the reader device and user device 102 is desired, UWB may be utilized.

In response, to the requested user action, the reader device may direct the peripheral device to perform an action, step 262. In some cases, the reader device my pass-through the requested user action, and in other cases, the reader device may adapt and transform the request to the format understood by the coupled peripheral device. In response to the request, the peripheral device may perform the desired action, step 264, e.g. move to a location, open or close a device, login or logout of computer network devices and services, and the like. In light of the present disclosure, it is believed that one or ordinary skill in the art will recognize may other types of actions that may be performed under the direction of the user via gestures, that are within the scope of embodiments of the present invention.

In various embodiments, the process described above may be repeated for other gestures and other requested actions, until pre-determined conditions terminate the session, or the user terminates the session, step 266.

FIG. 3 illustrates another block diagram of a process according to various embodiments. More specifically, FIG. 3 illustrates a process for a user defining a custom gesture map, as was described above.

In some embodiments, the user may invoke an application upon smart device 102 that enables this functionality, and in other embodiments, the user may invoke an application upon another smart device 118. In the latter case, after the process described herein, the custom gesture map may then be provided to smart device 102.

Initially, the user may perform a physical action with the user device to perform a gesture, step 300. As mentioned above, this may be any type of action, such as moving the device in a circle, to the right, tilting the device, and the like. The physical sensors within the user device captures the physical perturbation data in the form of acceleration data, rotation data, pressure data, magnetic field data, temperature data, imaging data (e.g. rotating a ring around a finger) and the like.

In various embodiments, the processor of the user device determines whether the perturbation data ban be classified as an existing (e.g. predetermined) gesture, step 302. For example, using the pattern matching techniques mentioned above, the processor can determine if the perturbation data is within a threshold of error away from a known gesture. In some embodiments, the perturbation data may be used as an instance of the known gesture, and also can be incorporated into the known gesture model. Advantages to such processes includes that the processor will be adapted to sense the specific physical characteristics of the user performing a gesture.

In various embodiments, after the user device captures perturbation data at 302, the perturbation data may be compared to a set of gestures. At step 304, it is determined whether the perturbation data matches one or more of a set of gestures. In various embodiments, if the perturbation data cannot be matched to an existing gesture, the smart device may ask the user if they are attempting to define a new gesture, step 306. At 306, if the perturbation data does not match one or more of a set gestures, the user may be prompted to answer the question 'define new gesture?' In some cases, if so, the user may be asked to repeat the movement data multiple times so the smart device can determine a stronger model for the gesture. In various embodiments, the new gesture may be stored in a gesture map along with the characteristics or a model of the associated perturbation data.

In various embodiments, with the application, the user may specify an action to be associated with the gesture, step 310. As examples, the action may be to perform an automatic door open, to return a drone to a base station, to log into a specific web service or to authorize a financial transaction, or the like. In some embodiments, is contemplated that a reader device associated with a specific peripheral device will know the specific application programming interface (APIs), for example, the peripheral device supports. In such cases, the action specified by the user will be interpreted by the reader device and the reader device will make the specific API calls. In other embodiments the user device may know how to make the specific API calls on the desired peripheral device. In such cases, the reader device may simply pass the API call from the user device to the peripheral device, for execution.

In various embodiments, the gesture map may be updated with the new gesture, new action, or the like, step 312. The process above may be repeated until the user is satisfied with the custom gesture map. As mentioned above, in some cases, the custom gesture map may be stored upon the user device, and in other cases, the custom gesture map may be maintained upon the authentication server. The latter case may be especially valuable when the user changes their smart device. For example, a user defines a custom gesture map and uses a first smart device and the custom gesture map to control a peripheral. Then if the user upgrades to their smart device to a second smart device, when the second smart device and user are authenticated by the authentication server, the authentication server may provide the custom gesture map previously used by the user. Accordingly, to the user, there is little, if any, discontinuity in service. Furthermore, if a second person picks up the first smart device and attempts to control the peripheral, the authentication server will not recognize the second person, and the custom gesture map will not provided to the first smart device. As can be seen, the first smart device becomes useless to control the peripheral device to other users than the first user.

Figure 4:
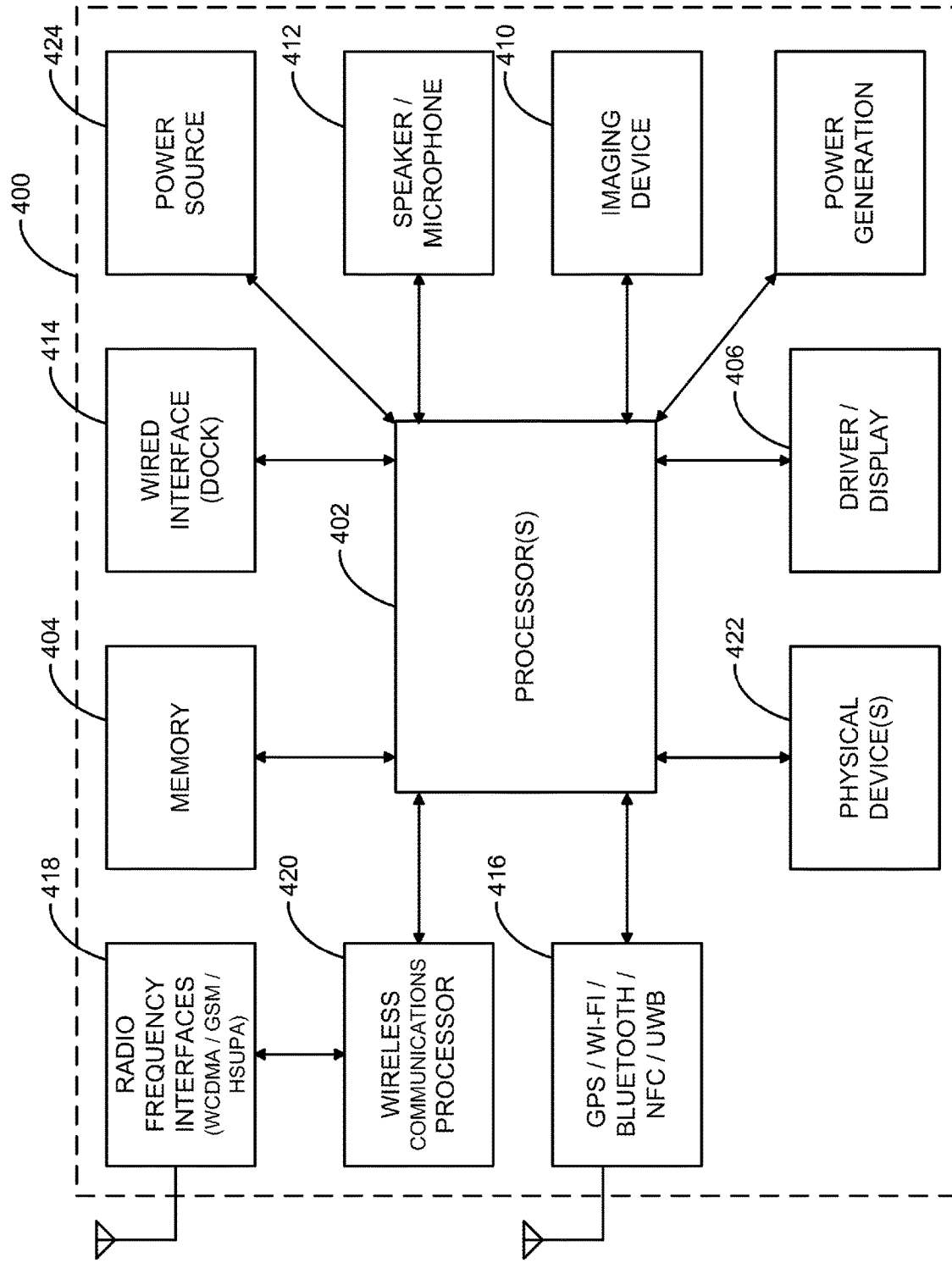
FIG. 4 is a block diagram illustrating an example of a system capable of implementing various processes in some embodiments.

FIG. 4 illustrates a functional block diagram of various embodiments of the present invention. More specifically, it is contemplated that from user smart devices to cloud-based servers may be implemented with a subset or superset of the below illustrated components. In FIG. 4, a computing device 400 typically includes an applications processor 402, memory 404, a display 406, an image acquisition device 410, audio input/output devices 412, and the like. Additional communications from and to computing device 400 can be provided by via a wired interface 414 (e.g. dock, plug); a GPS/Wi-Fi/Bluetooth interface/UWB 416; RF interfaces 418 and driver 420, and the like. Also included in some embodiments are physical sensors 422 (e.g., micro-electro-mechanical systems based (MEMS-based), accelerometers, gyros, magnetometers, pressure sensors, temperature sensors, bioimaging sensors etc.).

In various embodiments, computing device 400 may be a hand-held computing device (e.g. Apple iPad, Microsoft Surface, Samsung Galaxy Note, an Android Tablet); a smart phone (e.g. Apple iPhone, Google Pixel, Samsung Galaxy S); a portable computer (e.g. netbook, laptop, convertible), a media player (e.g. Apple iPod); a reading device (e.g. Amazon Kindle); a fitness tracker (e.g. Fitbit, Apple Watch, Garmin or the like); a headset or glasses (e.g. Oculus, Rift, HTC Vive, Sony Playstation VR, Magic Leap, Microsoft HoloLens); a wearable device (e.g. Motiv smart ring, smart headphones); an implanted device (e.g. smart device medical) or the like. Typically, computing device 400 may include one or more processors 402. Such processors 402 may also be termed application processors, and may include a processor core, a video/graphics core, and other cores. Processors 402 may include processor from Apple (A12, A13), NVidia (Tegra), Intel (Core), Qualcomm (Snapdragon), Samsung (Exynos), advanced reduced instruction set computer machine (ARM) (Cortex), multi-directional impact protection system (MIPS) technology. In some embodiments, processing accelerators may also be included, e.g., an artificial intelligence (AI) accelerator, Google (Tensor processing unit), a general processing unit (GPU), or the like. It is contemplated that other existing and/or later-developed processors may be used in various embodiments of the present invention.

In various embodiments, memory 404 may include different types of memory (including memory controllers), such as flash memory (e.g. non-volatile memory using the logic gate 'NOR', non-volatile memory using the logic gate 'NAND'), static random access memory (SRAM), double data rate synchronous dynamic random-access memory (DDR SDRAM), or the like. Memory 404 may be fixed within computing device 400 and may include removable (e.g. secure digital (SD), secure digital high capacity (SDHC), multi-media card (MMC), miniature SD (MINI SD), micro SD (MICRO SD), compact flash (CF), subscriber identity module (SIM)). The above are examples of computer readable tangible media that may be used to store embodiments of the present invention, such as computer-executable software code (e.g. firmware, application programs), security applications, application data, operating system data, databases or the like. It is contemplated that other existing and/or later-developed memory and memory technology may be used in various embodiments of the present invention.

In various embodiments, display 406 may be based upon a variety of later-developed or current display technology, including light-emitting diode (LED) or organic light-emitting diode (OLED) status lights or LED in-plane switching (IPS); touch screen technology (e.g. resistive displays, capacitive displays, optical sensor displays, electromagnetic resonance, or the like); and the like. Additionally, display 406 may include single touch or multiple-touch sensing capability. Any later developed or conventional output display technology may be used for the output display, such as LED IPS, OLED, Plasmas, electronic ink (e.g. electrophoretic, electrowetting, interferometric modulating), or the like. In various embodiments, the resolution of such displays and the resolution of such touch sensors may be based upon engineering or non-engineering factors (e.g. sales, marketing). In some embodiments, display 406 may integrated into computing device 400 or may be separate.

In some embodiments of the present invention, acquisition device 410 may include or more sensors, drivers, lenses and the like. The sensors may be visible light, infrared, and/or ultraviolet (UV) sensitive sensors that are based upon any later-developed or convention sensor technology, such as complementary metal oxide semiconductor (CMOS), charge-couples device (CCD), or the like. In some embodiments of the present invention, image recognition algorithms, image processing algorithms or other software programs for operation upon processor 402, to process the image data. For example, such software may pair with enabled hardware to provide functionality such as: facial recognition (e.g. Face ID, head tracking, camera parameter control, or the like); fingerprint capture/analysis; blood vessel capture/analysis; iris scanning capture/analysis; otoacoustic emission (OAE) profiling and matching; and the like. In various embodiments of the present invention, imaging device 410 may provide user input data in the form of a selfie, biometric data, or the like.

In various embodiments, audio input/output 412 may include conventional microphone(s)/speakers. In various embodiments, voice processing and/or recognition software may be provided to applications processor 402 to enable the user to operate computing device 400 by stating voice commands. In various embodiments of the present invention, audio input 412 may provide user input data in the form of a spoken work or phrase, or the like, and described above. In some embodiments, audio input/output 412 may be integrated into computing device 400 or may be separate.

In various embodiments, wired interface 414 may be used to provide data transfers between computing device 100 and an external source, such as a computer, a remote server, a storage network, another computing device 400, a client device, or the like. Embodiments may include any later-developed or conventional physical interface/protocol, such as: universal serial bus (USB), micro USB, mini USB, universal serial bus type-C (USB-C), Firewire, Apple Lightning connector, Ethernet, plain old telephone service (POTS), custom dock, or the like. In some embodiments, wired interface 414 may also provide electrical power, or the like to power source 424, or the like. In other embodiments interface 414 may utilize close physical contact of device 400 to a dock for transfer of data, magnetic power, heat or energy, or the like. Additionally, software that enables communications over such networks is typically provided.

In various embodiments, a wireless interface 416 may also be provided to provide wireless data transfers between computing device 400 and external sources, such as computers, storage networks, headphones, microphones, cameras, or the like. As illustrated in FIG. 4, wireless protocols may include Wi-Fi (e.g., Institute of Electrical and Electronics Engineers (IEEE) 802.11 a/b/g/n, worldwide interoperability for microwave access (WiMAX)), Bluetooth, Bluetooth Low Energy (BLE) IR, near field communication (NFC), ZigBee, Ultra-Wide Band (UWB), VviFi, mesh communications, and the like transmissions between computing device 400 and reader 114 may occur via UWB, Bluetooth, ZigBee, Wi-Fi, a mesh network, or the like. Further, GPS receiving capability may also be included in various embodiments of the present invention. As illustrated in FIG. 4, GPS functionality is included as part of wireless interface 416 merely for sake of convenience, although in implementation, such functionality may be performed by circuitry that is distinct from the Wi-Fi circuitry, the Bluetooth Circuitry, and the like. In various embodiments of the present invention, GPS receiving hardware may provide user input data in the form of current GPS coordinates, or the like, as described above.

Additional wireless communications may be provided via radio frequency (RF) interfaces 418 and drivers 420 in various embodiments. In various embodiments, RF interfaces 418 may support any future-developed or conventional radio frequency communications protocol, such as code-division multiple access (CDMA)-based protocols (e.g., wideband code-division multiple access (WCDMA)), global system for mobile communication (GSM)-based protocols, high-speed uplink packet access (HSUPA)-based protocols, one or more television networks (e.g., G4, G5), or the like. In the embodiments illustrated, driver 420 is illustrated as being distinct from applications processor 402 and wireless interface 416. However, in some embodiments, various functionality are provided upon a single integrated circuit (IC) package, for example the Marvel PXA330 processor, and the like. It is contemplated that some embodiments of computing device 400 need not include the wide area RF functionality provided by RF interface 418 and driver 420.

In various embodiments, any number of future developed, current operating systems, or custom operating systems may be supported, such as iPhone operating system (OS) (e.g., iOS), Google Android, Linux, Windows, MacOS, or the like In various embodiments of the present invention, the operating system may be a multi-threaded multi-tasking operating system. Accordingly, inputs and/or outputs from and to display 406 and inputs/or outputs to physical sensors 422 may be processed in parallel processing threads. In other embodiments, such events or outputs may be processed serially, or the like. Inputs and outputs from other functional blocks may also be processed in parallel or serially, in other embodiments of the present invention, such as acquisition device 410 and physical sensors 422.

In some embodiments of the present invention, physical sensors 422 (e.g. MEMS-based) accelerometers, gyros, magnetometers, pressure sensors, temperature sensors, imaging sensors (e.g. blood oxygen, heartbeat, blood vessel, iris data, etc.), thermometer, otoacoustic emission (OAE) testing hardware, and the like may be provided. The data from such sensors may be used to capture data associated with device 400, and a user of device 400. Such data may include physical motion data, pressure data, orientation data, or the like. Data captured by sensors 422 may be processed by software running upon processor 402 to determine characteristics of the user, e.g. gait, gesture performance data, or the like. In some embodiments, sensors 422 may also include physical output data, e.g. vibrations, pressures, and the like.

In some embodiments, a power supply 424 may be implemented with a battery (e.g. LiPo), ultracapacitor, or the like, that provides operating electrical power to device 400. In various embodiments, any number of power generation techniques may be utilized to supplement or even replace power supply 424, such as solar power, liquid metal power generation, thermoelectric engines, or the like.

FIG. 4 is representative of one computing device 400 capable of embodying the present invention. It will be readily apparent to one of ordinary skill in the art that many other hardware and software configurations are suitable for use with the present invention. Embodiments of the present invention may include at least some but need not include all of the functional blocks illustrated in FIG. 4. For example, a smart phone configured to perform may of the functions described above includes most if not all of the illustrated functionality. As another example, a biometric acquisition device, e.g. a smart ring (electronic devices enclosed in a ring-shaped shell, enclosure, or form factor), may include some of the functional blocks in FIG. 4, it need not include a high-resolution display 430 or a touch screen, a speaker/microphone 460, wired interfaces 470, or the like. In still other examples, a cloud-based server may not include image acquisition device 412, MEMs devices 422, GPS capability 416, and the like, further components described above may be distributed among multiple computers, virtual machines, or the like.

Figure 5:
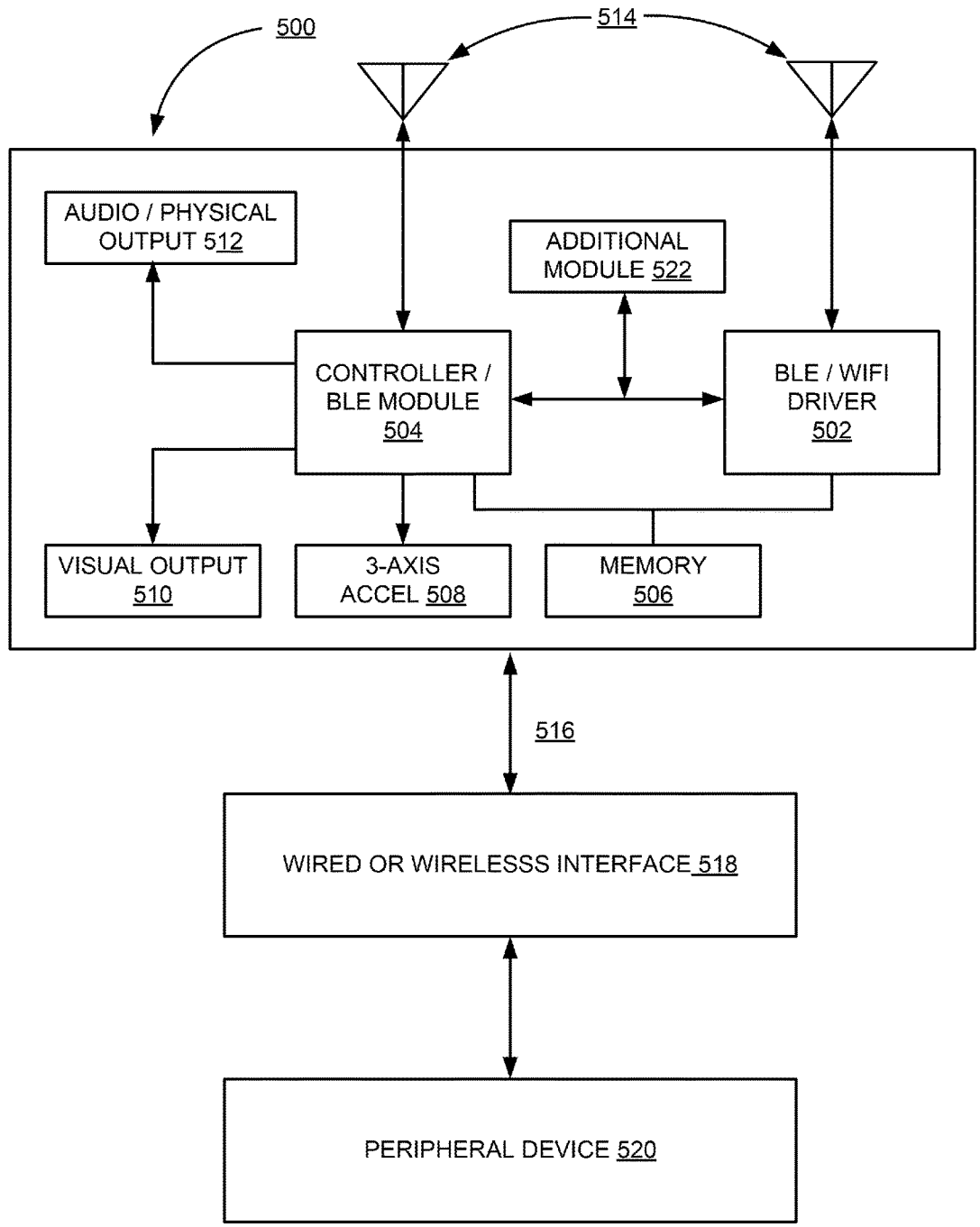
FIG. 5 is another block diagram of a reader according to various embodiments of the present invention.

FIG. 5 illustrates a block diagram according to some embodiments of the present invention. More specifically, FIG. 5 illustrates a block diagram of a reader device 500 described herein and illustrated as reader 114 in FIG. 1. In some embodiments, device 500 includes an rf control module 502, a controller 504, memory 506, an accelerometer 508, visual/haptic output 510, audio output 512, antennas 514, interface bus 516, and an interface module 518.

In some embodiments, controller 504 may be embodied as a Nordic nRF52832 system on a chip, suitable for controlling Bluetooth low energy (BLE) communications and UWB communications, and for performing various functionalities described herein. Controller 504 may include a processor, such as a 42-bit ARM@ Cortex®-M4F central processing unit (CPU) and include 512 kilobyte (kB) to 54 KB random access memory (RAM). In various embodiments, other types of SoC controllers may also be used, such as Blue Gecko from Silicon Labs, CC2508 from Texas Instruments (TI), or the like Controller 502 may be embodied as a muRata 1LD Wi-Fi/BLE module, suitable for controlling Bluetooth low energy (BLE), Wi-Fi communications. Controller 502 may include a processor, such as a 42-bit ARM® Cortex®-M4. In various embodiments, other types of controllers may also be used, such as CYW43012 from Cypress, or the like. In some embodiments, modules 502 and 504 enable communication via short range communications protocols, such as BLE, ZigBee, UWB, Wi-Fi or the like. Modules 502 and 504 may also support mesh networking via BLE, Wi-Fi 5, or the like. In some embodiments, module 502 also supports Wi-Fi communications to communicate over a wide-area network (e.g. Internet).

In various embodiments, memory 506 may include non-volatile memory storing embodiments of the executable software code described herein. In some embodiments, the memory may be SRAM, Flash memory, or the like. In FIG. 5, audio/haptic output 512 is provided to give a user with audio feedback or haptic feedback and visual output 510 is provided to give a user visual feedback in response to the user approaching reader device 500. In some embodiments, visual output 510 may be one or more LED lights having different colored outputs, may be a status display panel. The feedback may be provided to the user based upon an application running upon the smart device and interacting with reader device 500. For example, if the smart device does not have the proper credentials for reader device 500, a harsh buzzing sound may be played by audio output 510, and a red flashing light may be output by visual output 510; if the smart device is authenticated with reader device 500, a bell ding sound by be played and the text "OK" may be displayed on a display; if the smart device is not authenticated with reader device 500, an audio message and textual message may be output: "Not authenticated. For service. please contact . . . " or the like.

Accelerometer 528 is provided in some embodiments to determine whether reader device 500 is tampered with. For example, after installed and operable on a mounting location (e.g. on a wall), accelerometer 528 monitors the orientation of accelerometer 528 with respect to gravity. If a party attempts to remove reader device 500 from a mounting surface, accelerometer 528 will be able to sense the change in orientation. Based upon the change in orientation exceeding a threshold, a number of actions may be taken by reader device 500. One action may be to cease operation of reader device 500, another action may be to alert a remote server of the tampering, and the like. In other embodiments, other physical sensors, e.g. pressure sensors, light sensors, gyroscopes, and the like may be used. Such embodiments may also provide tamper detection indication.

In FIG. 5, interface 516 is used to couple reader device 500 to interface module 518. In various embodiments, interface module 518 interfaces with any number of external functional modules, e.g., peripheral device in FIG. 1, or the like. In one configuration, an external functional module 520 may be a peripheral device under control, e.g., automatic door (e.g., an Americans with Disabilities Act (ADA) compliant automatic door), a television, a vending machine, a computer, an electronic panel, an automobile, a kiosk or the like; in another configuration, external functional module 520 may be an existing module that is configured to read conventional low frequency (LF) or high frequency (HF) or ultrahigh frequency (UHF (LF/HF/UHF etc.) based proximity cards or badges; and the like as described herein In some embodiments, external reader module 520 may be an existing reader mounted upon a wall, or the like. In some embodiments, interface 516 may provide power to reader module 500, interface 516 may transmit data from reader device 500 to interface module 518 (e.g. credentials), provide power or the like.

In one configuration, rf control module 502 is not used, and only one antenna 514 is provided, or vice versa; in another configuration, modules 502 and 504 are both used, and two antennas 514 are used (one specifically for scanning for ephemeral IDs within a geographic region and one specifically for handling communications with a smart device). Such embodiments are particularly useful in high volume situations wherein one antenna may receive ephemeral IDs from many different smart devices (e.g. five users walking down a hall near a security door or vending machine), whereas the other antenna will provide the credentials and receive tokens from the specific users' smart devices who want to interact with the reader (e.g. to enter the security door, to receive a good, to access a computer, receive power or the like). In other embodiments, other channels may be used to provide the above communications, such as short-range Wi-Fi, Zigbee, NFC, advances and adaptive network technology (ANT), UWB or the like.

In still another configuration, additional modules 522 may be provided to add additional functionality to reader module 500. In some embodiments, module 522 may be an rf encoding module that converts data associated with the user (e.g. a badge number) into a format (e.g. LF/HF/UHF badge or tag) that is readable by a conventional radio frequency identification (RFID) card or badge reader. In some embodiments, module 522 may include one or more biometric capture devices that capture biometric data of a user associated with a smart device, or that couple to biometric capture devices. In some embodiments, biometric data may include facial data, voice data, eye data (e.g. iris, retina, blood vessel), print data (e.g. fingerprints, palm print, blood vessel), movement data (e.g. signature, movement, gait), OAE profile, heartbeat data, and the like that may be used to facilitate authentication of the user.

It is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claims subject matter to the specific examples provided in the present disclosure.

Further embodiments can be envisioned to one of ordinary skill in the art after reading this disclosure. For example, in some embodiments, authentication or authorization need not be performed for all devices (e.g. ring, smart device, etc.), In other examples, other types of criteria servers 124 may be used by an authentication server or by a user smart device before provided output of a token to a reader device. Embodiments of the authentication server integrating data 120 from other sources was discussed above, e.g. the user passing a specific health test; the user not being behind in certain payments (e.g. child-care); the user not being subject to a restraining order, etc. In additional embodiments, the user smart device may also be a gate keeper with regards to outputting the token. For example, user smart device 102 may restrict or allow output of a token if a temperature of the user for the past 48 hours has not exceeded a threshold; if the user has slept or rested for 8 hours within the last 24 hours; if the user is with a specific geofenced area; or the like. In some embodiments, authentication server 110 may also implement some of the services provided by server 124. In light of the current patent disclosure, one of ordinary skill in the art will recognize other criteria that can be incorporated into alternative embodiments of the present invention.

In other embodiments, combinations or sub-combinations of the above disclosed invention can be advantageously made. The block diagrams of the architecture and flow charts are grouped for ease of understanding. However, it should be understood that combinations of blocks, additions of new blocks. re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for controlling a remote device, comprising:
   receiving, via a short-range transceiver of a wearable device configured to be worn on a finger of a user, an authentication request from the remote device;
   outputting, to the remote device and via the short-range transceiver of the wearable device, an authorization token in response to the authentication request and based at least in part on one or more access attributes associated with a user satisfying a set of access criteria associated with the remote device, wherein the authorization token indicates that the user is authorized to interact with the remote device in accordance with a gesture map, the gesture map comprising one or more predefined gestures corresponding with one or more requested actions to be performed by the remote device;
   detecting, via one or more processors of the wearable device, a plurality of physical perturbations via one or more physical sensors, the plurality of physical perturbations associated with one or more physical actions of the user, wherein the one or more physical sensors comprise one or more sensors of the wearable device;
   identifying, via one or more processors of the wearable device, a gesture performed by the user based at least in part on the plurality of physical perturbations;
   identifying a requested action from the one or more requested actions of the gesture map to be performed by the remote device based at least in part on the one or more access attributes of the user and based at least in part on comparing the gesture to the gesture map; and
   outputting, to the remote device and via the short-range transceiver of the wearable device, a request for the remote device to perform the requested action.

2. The method of claim 1, further comprising:
   acquiring biometric data from the user via the one or more sensors of the wearable device and based at least in part on the authentication request; and
   determining whether the user is authorized to interact with the remote device based at least in part on whether the biometric data associated with the user satisfies one or more biometric criteria, wherein outputting the authorization token is based at least in part on the biometric data satisfying the one or more biometric criteria.

3. The method of claim 2, wherein the one or more biometric criteria comprise a presence or absence of a medical condition, illness, or disease.

4. The method of claim 1, further comprising:
   communicating a token request to an authentication server in response to the authentication request and an identifier associated with the user; and receiving authentication data from the authentication server, wherein the authorization token is based at least in part on the authentication data received from the authentication server.

5. The method of claim 1, further comprising:
receiving reference perturbation data associated with the one or more predefined gestures performed by the user;
receiving an indication of one or more requested actions to be performed by the remote device in response to the one or more predefined gestures; and
generating the gesture map based at least in part on the one or more predefined gestures and the one or more requested actions, and wherein identifying the requested action to be performed by the remote device is based at least in part on matching the gesture to the one or more predefined gestures of the gesture map.

6. The method of claim 5, wherein the reference perturbation data is associated with a plurality of iterations of a predefined gesture of the one or more predefined gestures, the method further comprising:
generating a model for the predefined gesture based at least in part on the reference perturbation data associated with the plurality of iterations of the predefined gesture, wherein generating the gesture map is based at least in part on generating the model for the predefined gesture.

7. The method of claim 1, wherein the remote device is associated with a plurality of gesture maps corresponding to a plurality of users, the plurality of gesture maps comprising the gesture map associated with the user.

8. The method of claim 1, wherein the one or more access attributes associated with the user comprise a set of remote devices that the user is authorized to interact with, an employment status of the user, a professional qualification of the user, a security clearance of the user, or any combination thereof.

9. The method of claim 1, wherein the remote device comprises a drone, a ground-based vehicle, a water-based device, a car, a cart, a television, or a boat.

10. The method of claim 1, wherein the requested action performed by the remote device comprises locking or unlocking the remote device, setting one or more operational parameters of the remote device, opening or closing a door of the remote device, starting or stopping an alarm of the remote device, moving the remote device, or a combination thereof.

11. The method of claim 1, wherein the wearable device comprises a smart ring.

12. A wearable device configured to be worn on a finger of a user for controlling a remote device, comprising:
one or more sensors configured to capture biometric data associated with a user;
a short-range transceiver configured to exchange wireless communications with the remote device; and
one or more processors coupled with the one or more sensors and the short-range transceiver, wherein the one or more processors are configured to:
receive an authentication request from a remote device;
output an authorization token to the remote device in response to the authentication request and based at least in part on one or more access attributes associated with the user satisfying a set of access criteria associated with the remote device, wherein the authorization token indicates that the user is authorized to interact with the remote device in accordance with a gesture map, the gesture map comprising one or more predefined gestures corresponding with one or more requested actions to be performed by the remote device;
detect, via the one or more sensors, a plurality of physical perturbations associated with one or more physical actions of the user;
identify a gesture performed by the user based at least in part on the plurality of physical perturbations;
identify a requested action from the one or more requested actions of the gesture map to be performed by the remote device based at least in part on the one or more access attributes of the user and based at least in part on comparing the gesture to the gesture map; and
output, to the remote device and via the short-range transceiver of the wearable device, a request for the remote device to perform the requested action.

13. The wearable device of claim 12, wherein the one or more processors are further configured to:
acquire the biometric data from the user via the one or more sensors based at least in part on the authentication request; and
determine whether the user is authorized to interact with the remote device based at least in part on whether the biometric data associated with the user satisfies one or more biometric criteria, wherein outputting the authorization token is based at least in part on the biometric data satisfying the one or more biometric criteria.

14. The wearable device of claim 13, wherein the one or more biometric criteria comprise a presence or absence of a medical condition, illness, or disease.

15. The wearable device of claim 12, wherein the one or more processors are further configured to:
communicate a token request to an authentication server in response to the authentication request and an identifier associated with the user; and
receive authentication data from the authentication server, wherein the authorization token is based at least in part on the authentication data received from the authentication server.

16. The wearable device of claim 12, wherein the one or more processors are further configured to:
receive reference perturbation data associated with the one or more predefined gestures performed by the user;
receive an indication of one or more requested actions to be performed by the remote device in response to the one or more predefined gestures; and
generate the gesture map based at least in part on the one or more predefined gestures and the one or more requested actions, and wherein identifying the requested action to be performed by the remote device is based at least in part on matching the gesture to the one or more predefined gestures of the gesture map.

17. The wearable device of claim 16, wherein the reference perturbation data is associated with a plurality of iterations of a predefined gesture of the one or more predefined gestures, wherein the one or more processors are further configured to:
generate a model for the predefined gesture based at least in part on the reference perturbation data associated with the plurality of iterations of the predefined gesture, wherein generating the gesture map is based at least in part on generating the model for the predefined gesture.

18. The wearable device of claim 12, wherein the remote device is associated with a plurality of gesture maps corresponding to a plurality of users, the plurality of gesture maps comprising the gesture map associated with the user.

19. The wearable device of claim 12, wherein the one or more access attributes associated with the user comprise a set of remote devices that the user is authorized to interact with, an employment status of the user, a professional qualification of the user, a security clearance of the user, or any combination thereof.

20. The wearable device of claim 12, wherein the remote device comprises a drone, a ground-based vehicle, a water-based device, a car, a cart, a television, or a boat, and wherein the requested action performed by the remote device comprises locking or unlocking the remote device, setting one or more operational parameters of the remote device, opening or closing a door of the remote device, starting or stopping an alarm of the remote device, moving the remote device, or a combination thereof.

* * * * *